United States Patent
Chang et al.

(10) Patent No.: US 9,157,477 B2
(45) Date of Patent: Oct. 13, 2015

(54) LINEAR MOTION GUIDE APPARATUS HAVING LUBRICATING OIL WIPING MECHANISM

(71) Applicant: Hiwin Technologies Corp., Taichung (TW)

(72) Inventors: Lung Yu Chang, Taichung (TW); Yun Yi Lin, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 17 days.

(21) Appl. No.: 14/055,912

(22) Filed: Oct. 17, 2013

(65) Prior Publication Data

US 2015/0110425 A1    Apr. 23, 2015

(51) Int. Cl.
*F16C 29/06* (2006.01)
*F16C 29/08* (2006.01)
*F16C 33/10* (2006.01)

(52) U.S. Cl.
CPC ............. *F16C 29/086* (2013.01); *F16C 33/106* (2013.01); *F16C 29/0635* (2013.01); *F16C 29/0642* (2013.01); *F16C 29/0647* (2013.01)

(58) Field of Classification Search
CPC ........ F16C 29/086; F16C 29/04; F16C 29/06; F16C 29/0609; F16C 29/0633; F16C 29/0635; F16C 29/0638; F16C 29/0642; F16C 29/084; F16C 33/106
USPC .......................................................... 384/15
See application file for complete search history.

(56) References Cited

U.S. PATENT DOCUMENTS

| | | | |
|---|---|---|---|
| 1,636,027 A * | 7/1927 | Walter ........................... 277/464 |
| 3,851,889 A * | 12/1974 | Nisper ........................... 277/461 |
| 5,494,354 A * | 2/1996 | Tsukada ........................ 384/13 |
| 5,769,543 A * | 6/1998 | Tsukada et al. ................ 384/15 |
| 7,044,641 B2 | 5/2006 | Scotte et al. |
| 7,556,430 B2 | 7/2009 | Wu et al. |
| 7,658,544 B2 | 2/2010 | Chen et al. |
| 7,686,514 B2 | 3/2010 | Hung et al. |
| 7,736,059 B2 | 6/2010 | Chen et al. |
| 8,070,360 B2 * | 12/2011 | Michioka et al. .............. 384/13 |
| 8,082,814 B2 | 12/2011 | Jiang et al. |
| 2003/0059134 A1 * | 3/2003 | Mochizuki et al. ............ 384/15 |
| 2008/0144980 A1 * | 6/2008 | Keller et al. ................... 384/15 |
| 2008/0159669 A1 * | 7/2008 | Chen et al. .................... 384/15 |
| 2010/0133757 A1 * | 6/2010 | Maeda et al. .................. 277/436 |
| 2013/0011086 A1 * | 1/2013 | Matsumoto .................... 384/15 |
| 2013/0243355 A1 * | 9/2013 | Kawakami ..................... 384/15 |

* cited by examiner

*Primary Examiner* — Alan B Waits
(74) *Attorney, Agent, or Firm* — Charles E. Baxley

(57) ABSTRACT

A linear motion guide device includes a slider slidably attached onto a guide rail, two dust caps oppositely attached to end portions of the slider respectively and each having a channel formed between two legs for slidably engaging with the guide rail, and each having a lip portion directed toward the guide rail for wiping the engaging surface of the guide rail, and the lip portions of the legs of the dust caps each include an inner flange directed toward the slider and each include a number of notches and a number of projections formed in the inner flange of each of the legs and offset from each other for wiping the lubricating fluid into the notches of the legs respectively.

1 Claim, 5 Drawing Sheets

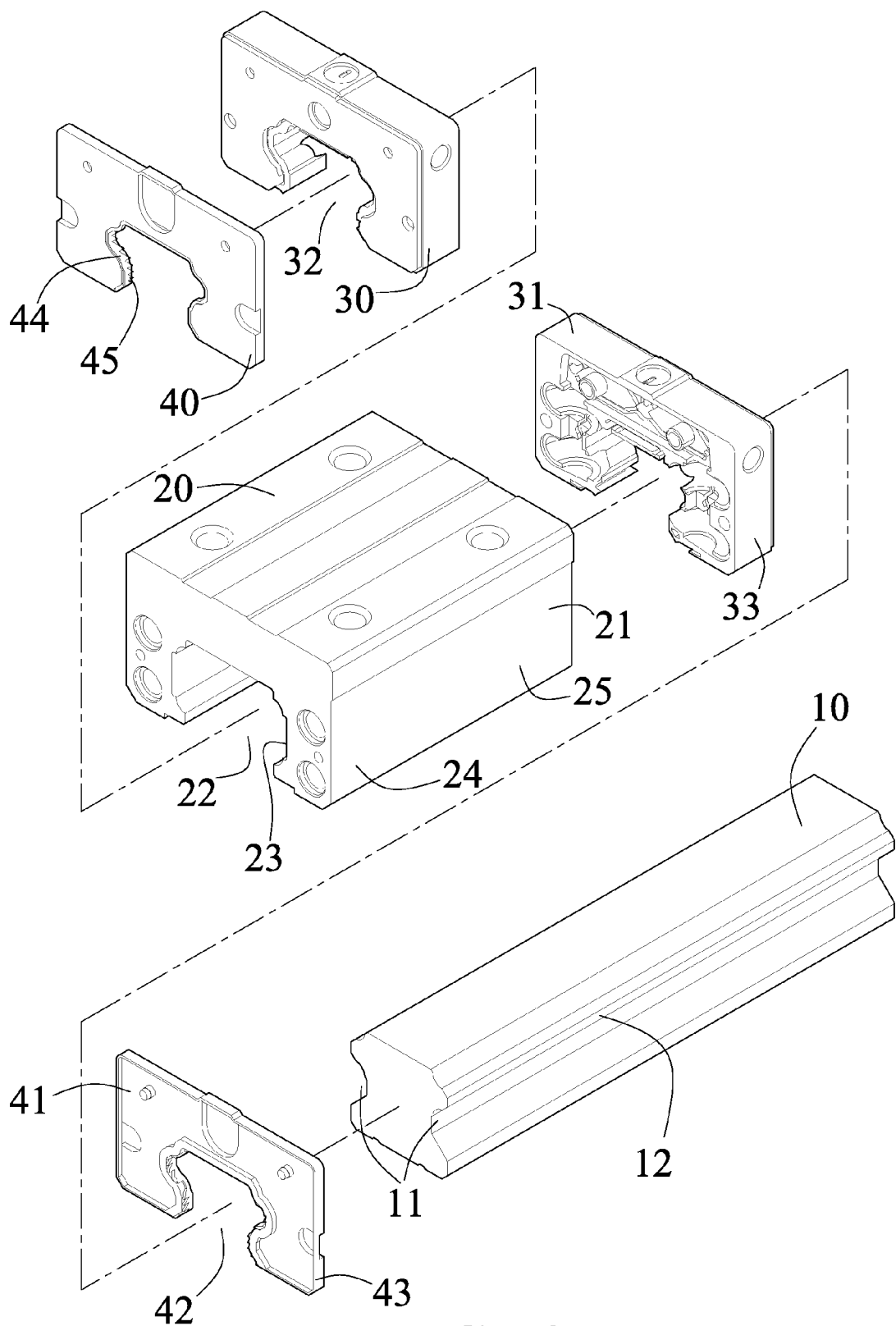
F I G. 3

LINEAR MOTION GUIDE APPARATUS HAVING LUBRICATING OIL WIPING MECHANISM

BACKGROUND OF THE INVENTION

1. Field of the Invention

The present invention relates to a linear motion guide apparatus, and more particularly to a linear motion guide apparatus including a lubricating oil agitating or wiping device or arrangement or structure or mechanism designed and arranged for suitably agitating or wiping or moving or circulating the lubricant or lubricating oil or fluid to lubricate the two movable members or elements, such as the slider and the guide rail and for allowing the slider and the guide rail to be smoothly moved relative to each other.

2. Description of the Prior Art

Various kinds of typical linear motion guide devices have been developed and comprise a slider or slide block slidably attached onto a guide rail, and normally, a ball bearing device is disposed between the slider and the guide rail for facilitating the sliding movement between the slider and the guide rail and for allowing the slider and the guide rail to be smoothly moved relative to each other.

For example, the applicant has also developed various kinds of typical linear motion guide devices or apparatuses as disclosed in the following patents, U.S. Pat. No. 7,044,641 to Scotte et al., U.S. Pat. No. 7,556,430 to Wu et al., U.S. Pat. No. 7,658,544 to Chen et al., U.S. Pat. No. 7,686,514 to Hung et al., U.S. Pat. No. 7,736,059 to Chen et al., and U.S. Pat. No. 8,082,814 to Jiang et al. disclose several of the typical linear motion rolling guide units or devices or apparatuses each comprising a slider or slide block slidably attached onto a guide rail, and a ball bearing device disposed and engaged between the slider and the guide rail and engaged in the endless ball guiding raceway for facilitating the sliding movement between the slider and the guide rail and for allowing the slider and the guide rail to be smoothly moved relative to each other.

Normally, the slider and the guide rail and/or the ball bearing device are moved in a fast speed relative to each other, and a lubricating device is required to be provided or disposed or engaged in the slider and/or the guide rail for filling or supplying the lubricant or lubricating oil or fluid into the endless ball guiding raceway and the slider for suitably lubricating the ball bearing device.

However, the lubricant or lubricating oil or fluid normally will permeate or flow out of the slider and/or the guide rail, and the dust caps or wipers at the end portions of the slider normally include a planar or smooth contacting surface with the guide rail and may not be used to suitably or effectively wipe or clean the lubricant or lubricating oil or fluid that is permeated or flown out of the slider and/or the guide rail, and such that the lubricant or lubricating oil or fluid may have a good chance to be consumed or used up quickly, and such that the two movable members or elements may not be smoothly moved relative to each other after a predetermined time interval of use.

The present invention has arisen to mitigate and/or obviate the afore-described disadvantages of the conventional lubricating structures or devices for linear motion guide devices.

SUMMARY OF THE INVENTION

The primary objective of the present invention is to provide a linear motion guide apparatus including a lubricating oil agitating or wiping device or arrangement or structure or mechanism designed and arranged for suitably agitating or wiping or moving or circulating the lubricant or lubricating oil or fluid to lubricate the two movable members or elements, such as the slider and the guide rail and for allowing the slider and the guide rail to be smoothly moved relative to each other.

In accordance with one aspect of the invention, there is provided a linear motion guide apparatus comprising a guide rail including two side engaging surfaces, a slider slidably attached onto the guide rail for moving along the guide rail, and including two opposite protrusions for forming a chamber between the protrusions and for slidably receiving and engaging with the guide rail and for guiding the slider to move relative to the guide rail, the protrusions each including a guiding surface directed toward the engaging surface of the guide rail respectively, and a first dust cap and a second dust cap oppositely attached to end portions of the slider respectively, the first and the second dust caps each including a channel formed between two legs for slidably receiving and engaging with the guide rail and for guiding the first and the second dust caps to move relative to and along the guide rail, the legs of the first and the second dust caps each including a lip portion directed toward the engaging surface of the guide rail respectively for contacting and engaging with and for wiping the engaging surface of the guide rail respectively, and the lip portions of the legs of the first and the second dust caps each including an inner flange directed toward the slider and each including a number of notches and a number of projections formed and provided in the inner flange of each of the legs for engaging with and for wiping a lubricating fluid into the notches of the legs respectively.

The projections of the legs each include a tip portion, and the tip portions of the projections of the first and the second dust caps are disengaged or offset from each other for suitably and effectively wiping or sweeping or moving the lubricant or lubricating oil or fluid into the notches of the dust caps alternatively when the slider and the dust caps are moved in opposite directions relative to and along the guide rail.

The projections and/or the notches of the legs each include a substantially triangular shape or structure or configuration for suitably and effectively wiping or sweeping or moving or guiding the lubricant or lubricating oil or fluid into the notches of the dust caps alternatively.

Two end caps may further be provided and oppositely attached to end portions of the slider respectively, and the first and the second dust caps are attached to the end caps respectively to have the end caps to be disposed or attached or secured between the slider and the dust caps respectively.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a partial exploded view of the linear motion guide apparatus;

DETAILED DESCRIPTION OF THE PREFERRED EMBODIMENT

Figure 7:
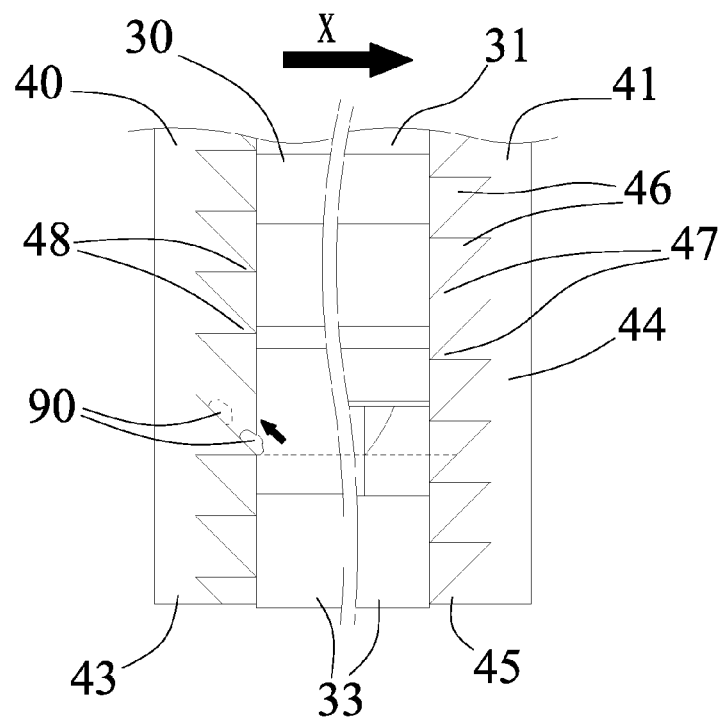
FIGS. 7, 8 are enlarged partial cross sectional views similar to FIG. 6, illustrating the operation of the linear motion guide apparatus.
Figure 8:
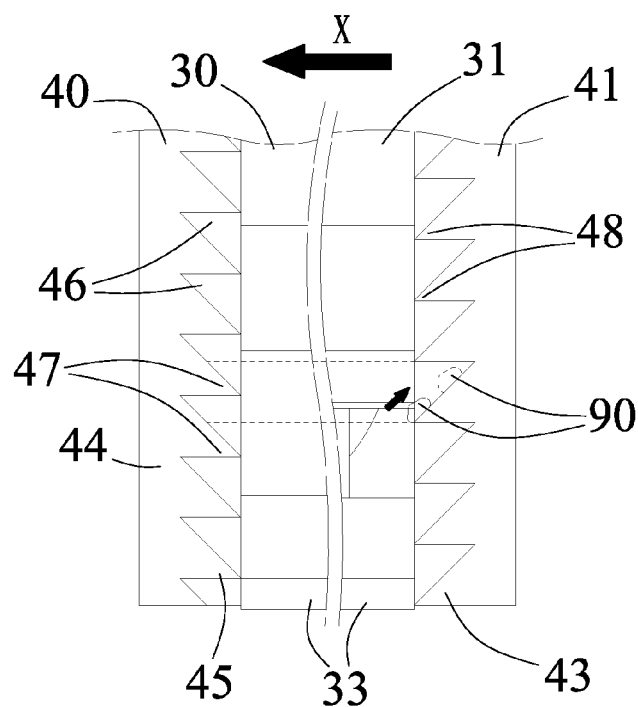

Referring to the drawings, and initially to FIGS. 1-3 and 5, a linear motion guide apparatus in accordance with the present invention comprises a guide rail 10 including a substantially I-shaped cross section having two longitudinal recesses 11 formed in the side portions thereof and formed or defined by serrated or curved or uneven or selected outer engaging surfaces 12 respectively, a slide block or a slider 20 slidably attached onto the guide rail 10 and arranged to be moved along the guide rail 10, and normally, and a ball bearing device (not illustrated) normally will be disposed or engaged between the slider 20 and the guide rail 10 for facilitating the sliding movement between the slider 20 and the guide rail 10 and for allowing the slider 20 and the guide rail 10 to be smoothly moved relative to each other along the X-axis (FIGS. 3, 7-8).

The slider 20 includes two opposite and longitudinal projections or bulges or protrusions 21 extended therefrom for forming or defining a chamber 22 between the protrusions 21 and for slidably receiving or engaging with the guide rail 10 and for guiding the slider 20 and the guide rail 10 to smoothly move relative to each other. The protrusions 21 each include a serrated or curved or uneven or selected inner engaging or guiding surface 23 formed therein and faced or directed toward the engaging surface 12 of the guide rail 10 respectively for allowing the ball or roller bearing device or the like (not illustrated) to be solidly and stably disposed or engaged between the slider 20 and the guide rail 10. The sliding engagement or attachment or mechanism between the slider 20 and the guide rail 10 with the ball bearing device is typical and is not related to the present invention and will not be described in further details.

The linear motion guide apparatus in accordance with the present invention, selectively or optionally further includes two housings or casings or end caps 30, 31 and/or two wipers or dust caps 40, 41 oppositely disposed or attached or mounted or secured onto the two sides or the outer portions or the end portions 24, 25 of the slider 20 respectively, the end caps 30, 31 and the dust caps 40, 41 each include a channel 32, 42 formed in the lower portion thereof and formed or defined between two legs 33, 43 for slidably receiving or engaging onto the guide rail 10 and for guiding the end caps 30, 31 and the dust caps 40, 41 to smoothly move relative to and along the guide rail 10. The legs 43 of the dust caps 40, 41 each include a serrated or curved or uneven or selected inner engaging or guiding or wiping surface or lip portion 44 formed therein for contacting or engaging with the engaging surface 12 of the guide rail 10 respectively.

It is to be noted that the dust caps 40, 41 may also be directly attached or mounted or secured onto the two sides or the outer portions or the end portions 24, 25 of the slider 20 respectively without the end caps 30, 31 and may also include a serrated or curved or uneven or selected inner engaging or guiding or wiping surface or lip portion 44 formed in each of the leg 43 of the dust cap 40, 41 and faced or directed toward the engaging surface 12 for contacting or engaging with and for wiping or cleaning the engaging surface 12 of the guide rail 10 respectively. The inner wiping surfaces or lip portions 44 of the legs 43 of each of the dust caps 40, 41 each further include an inner portion or segment or flange 45 faced or directed toward the end caps 30, 31 and/or the slider 20 and contacted or engaged with the end caps 30, 31 and/or the slider 20 respectively.

As shown in FIGS. 2-6, the dust caps 40, 41 each further include a number of openings or cavities or recesses or notches 46 and a number of bulges or swellings or teeth or protrusions or projections 47 formed or provided in the inner flange 45 of the inner wiping lip portion 44 of each of the legs 43 that are faced or directed toward and contacted or engaged with the end caps 30, 31 and/or the slider 20 respectively, for engaging with the lubricant or lubricating oil or fluid and for wiping or sweeping or moving the lubricant or lubricating oil or fluid toward the guiding surfaces 23 of the protrusions 21 of the slider 20 and the engaging surfaces 12 of the guide rail 10 respectively. The notches 46 and the projections 47 are preferably alternatively formed or provided in the inner flange 45 of the inner wiping lip portion 44 of each of the legs 43, and each include a substantially triangular shape or structure or configuration.

Figure 1:
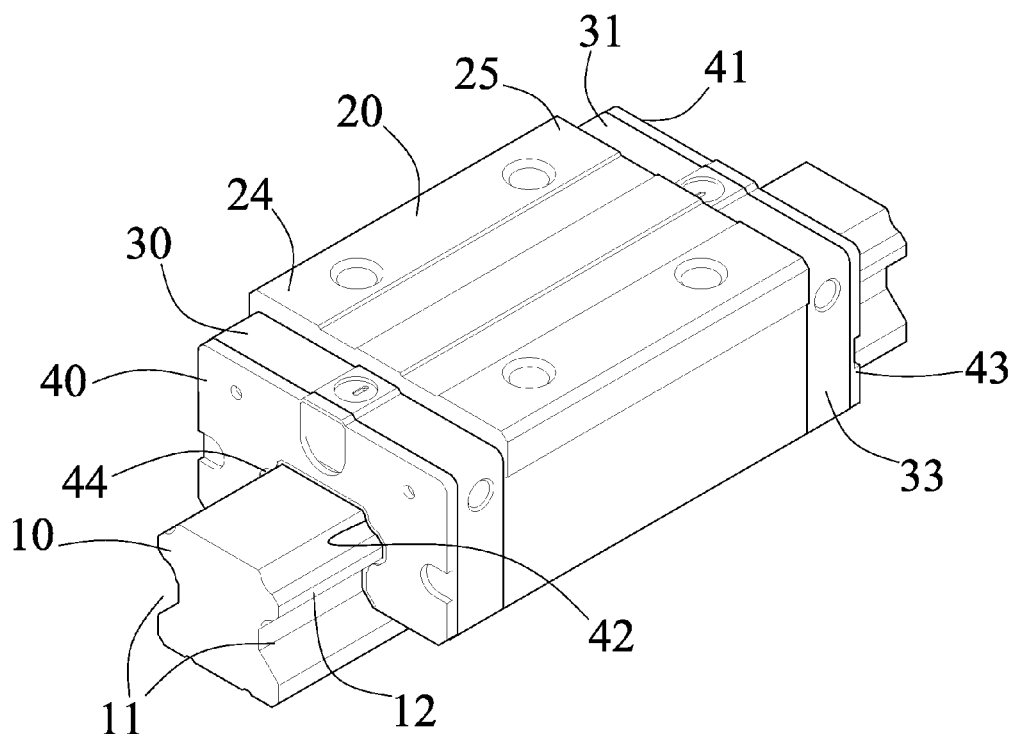
FIG. 1 is a perspective view of a linear motion guide apparatus in accordance with the present invention.
Figure 2:
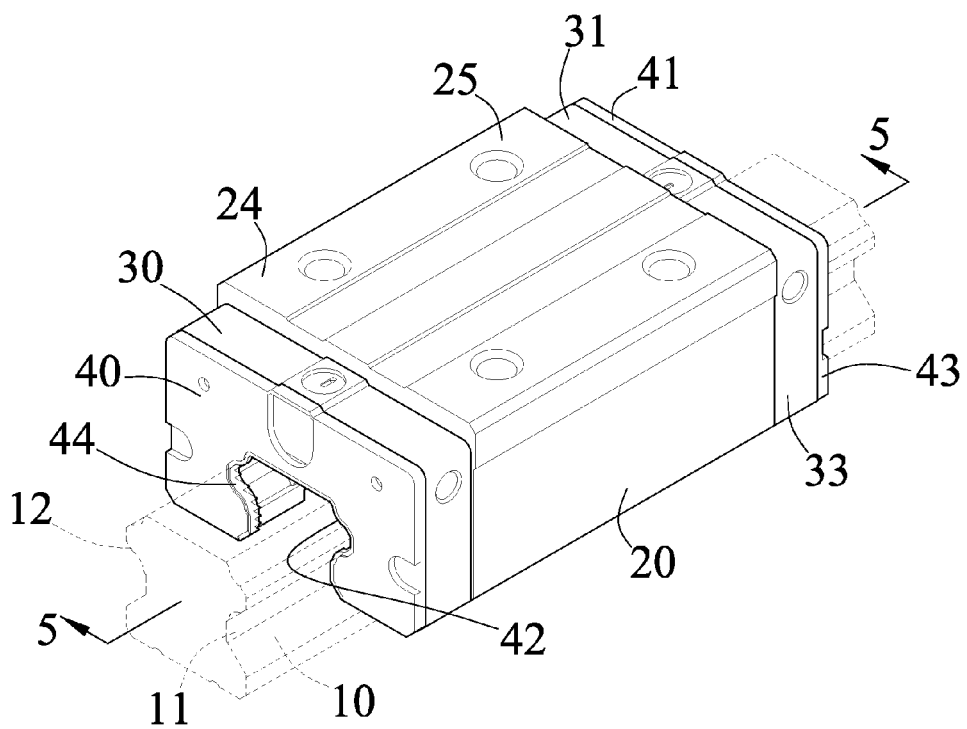
FIG. 2 is another perspective view similar to FIG. 1, in which the guide rail of the linear motion guide apparatus has been shown in dotted lines for showing the inner structure of the linear motion guide apparatus.
Figure 4:
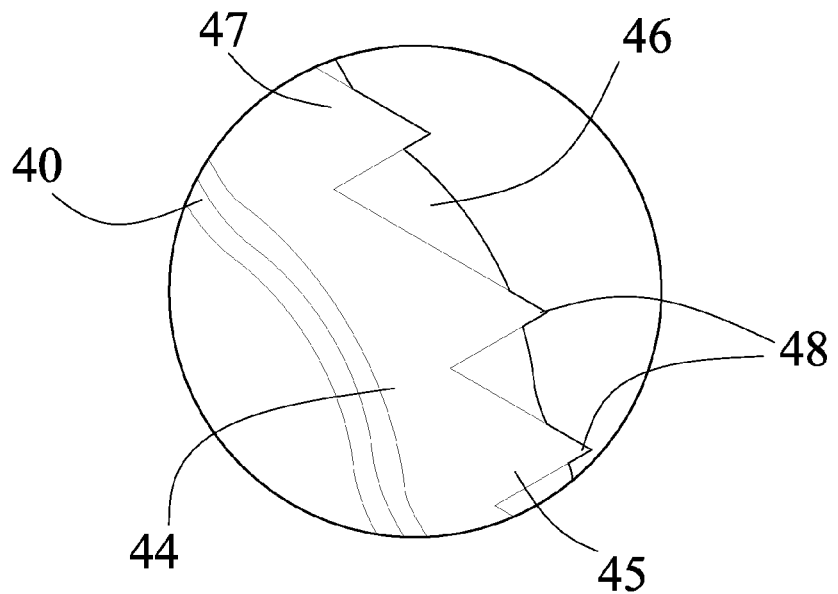
FIG. 4 is an enlarged partial perspective view of the dust cap or wiper.
Figure 5:
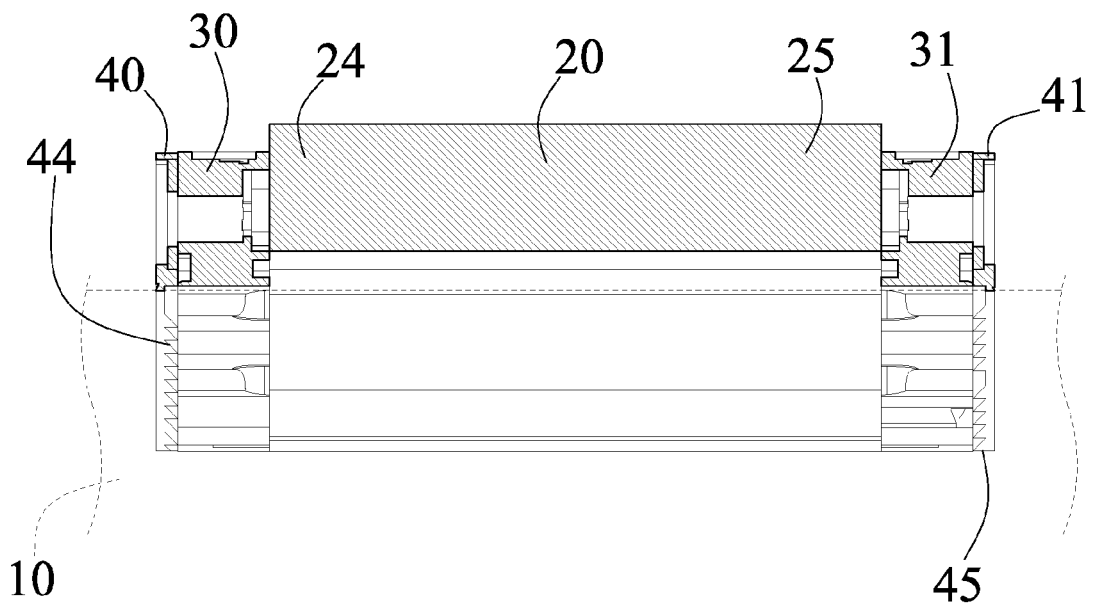
FIG. 5 is a cross sectional view of the linear motion guide apparatus taken along lines 5-5 of FIG. 2.
Figure 6:
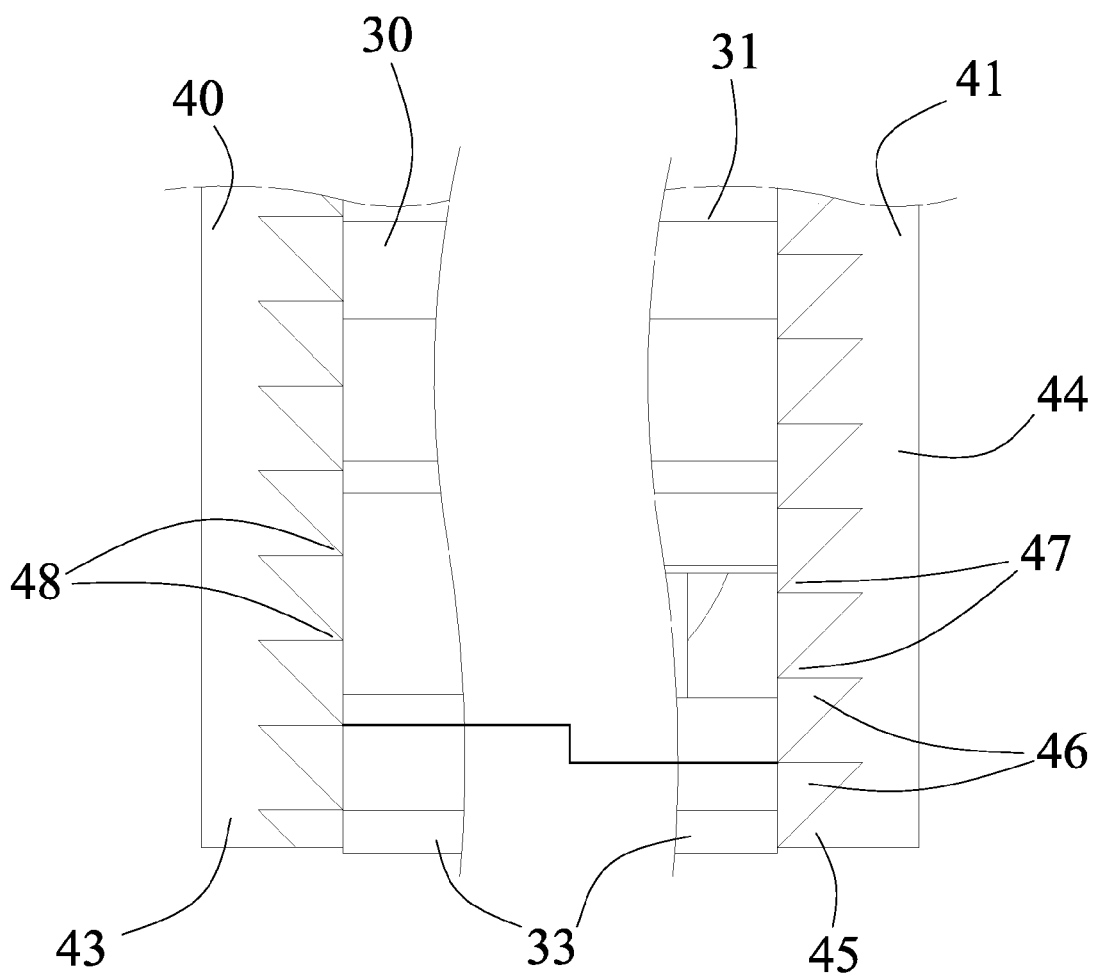
FIG. 6 is an enlarged partial cross sectional view of the linear motion guide apparatus as shown in FIG. 5.

The projections 47 each include an angle or tip portion 48 for engaging with and for wiping or guiding the lubricant or lubricating oil or fluid 90 (FIGS. 7, 8) to move into the notches 46 of the legs 43 and then toward the guiding surfaces 23 of the slider 20 and the engaging surfaces 12 of the guide rail 10 respectively. As best shown in FIGS. 6-8, the tip portions 48 of the projections 47 of the two dust caps 40, 41 are disposed or located and arranged alternatively or disengaged or separated of offset from each other; i.e., the tip portions 48 of the projections 47 of the two dust caps 40, 41 are not parallel to or aligned with each other for suitably and effectively wiping or sweeping or moving the lubricant or lubricating oil or fluid 90 into the notches 46 of the dust caps 40, 41 alternatively.

In operation, as shown in FIG. 7, when the slider 20 and/or the end caps 30, 31 and the dust caps 40, 41 are moved in one direction, such as rightward relative to and along the guide rail 10, the lubricating fluid 90 on the engaging surfaces 12 of the guide rail 10 may be contacted or engaged with the tip portions 48 of the projections 47 of one of the dust caps or the left or first dust cap 40 and may be wiped or swept or moved into the notches 46 of the left or first dust cap 40. On the contrary, as shown in FIG. 8, when the slider 20 and/or the end caps 30, 31 and the dust caps 40, 41 are moved in the other or opposite direction, such as leftward relative to and along the guide rail 10, the lubricating fluid 90 on the engaging surfaces 12 of the guide rail 10 may be contacted or engaged with the tip portions 48 of the projections 47 of the other dust cap or the right or second dust cap 41 and may be wiped or swept or moved into the notches 46 of the right or second dust cap 41.

Accordingly, the linear motion guide apparatus in accordance with the present invention includes a lubricating oil agitating or wiping device or arrangement or structure or mechanism designed and arranged for suitably agitating or wiping or moving or circulating the lubricant or lubricating oil or fluid to lubricate the two movable members or elements, such as the slider and the guide rail and for allowing the slider and the guide rail to be smoothly moved relative to each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:
1. A linear motion guide apparatus comprising:
a guide rail including two side engaging surfaces,
a slider slidably attached onto said guide rail for moving along said guide rail, and said slider including two opposite protrusions for forming a chamber between said protrusions and for slidably receiving and engaging with said guide rail and for guiding said slider to move relative to said guide rail, said protrusions each including a guiding surface directed toward said engaging surface of said guide rail respectively,
two end caps oppositely attached to end portions of said slider respectively, and said end caps each including a channel formed between two legs for slidably receiving and engaging with said guide rail and for guiding said end caps to move relative to and along said guide rail, and
a first dust cap and a second dust cap oppositely attached to said end caps respectively, said first and said second dust caps each including a channel formed between two legs for slidably receiving and engaging with said guide rail and for guiding said first and said second dust caps to move relative to and along said guide rail, said legs of said first and said second dust caps each including a lip portion directed toward said engaging surface of said guide rail respectively for contacting and engaging with and for wiping said engaging surface of said guide rail respectively, and said lip portions of said legs of said first and said second dust caps each including an inner flange directed toward said end cap and each dust cap including a plurality of notches and a plurality of projections formed and provided in said inner flange of each of said legs for engaging with and for wiping a lubricating fluid into said notches of said legs respectively, said projections of said legs each including a triangular shape, said notches of said legs each including a triangular shape, said projections of said legs each including a tip portion, and said tip portions of said projections of said first dust cap are offset from said tip portions of said projections of said second dust cap.

* * * * *